(12) United States Patent
Mukherjee et al.

(10) Patent No.: US 8,989,113 B2
(45) Date of Patent: Mar. 24, 2015

(54) METHOD AND SYSTEM FOR PARTITIONING CONTENTION BASED RESOURCES IN A WIRELESS NETWORK

(75) Inventors: Biswaroop Mukherjee, Stittsville (CA); Nicholas William Anderson, Bristol (GB); William Anthony Gage, Stittsville (CA); Robert Novak, Stittsville (CA); Eswar Vutukuri, Hampshire (GB)

(73) Assignee: BlackBerry Limited, Waterloo (CA)

( * ) Notice: Subject to any disclaimer, the term of this patent is extended or adjusted under 35 U.S.C. 154(b) by 300 days.

(21) Appl. No.: 13/470,238

(22) Filed: May 11, 2012

(65) Prior Publication Data

US 2013/0301541 A1     Nov. 14, 2013

(51) Int. Cl.
    *H04W 72/04*      (2009.01)

(52) U.S. Cl.
    USPC .......................................................... 370/329

(58) Field of Classification Search
    CPC ... H04L 12/4035; H04L 12/413; H04L 67/04; H04W 72/00; H04W 74/04; H04W 16/02; H04W 16/10; H04W 16/12; H04J 3/16
    USPC ................. 370/312, 329, 445; 455/405, 450
    See application file for complete search history.

(56) References Cited

U.S. PATENT DOCUMENTS

| | | | |
|---|---|---|---|
| 8,688,073 B2 * | 4/2014 | Peisa et al. ................. | 455/405 |
| 2007/0058660 A1 * | 3/2007 | Sammour et al. .......... | 370/445 |
| 2009/0042582 A1 * | 2/2009 | Wang et al. ................ | 455/450 |
| 2011/0194478 A1 * | 8/2011 | Lee et al. ................... | 370/312 |
| 2014/0016572 A1 * | 1/2014 | Cave et al. ................. | 370/329 |

FOREIGN PATENT DOCUMENTS

WO      2013110331      8/2013

OTHER PUBLICATIONS

International Search Report on International Application No. 2013000461, issued on Aug. 21, 2013.
European Search Report on European Application No. 13167227.1, issued on Nov. 5, 2013.
3GPP TSG-RAN WG #78, "Uplink Resources and Scheduling Request for Delay-Tolerant Applications," InterDigital Communications, Prague, Czech Republic, May 21-25, 2012.
3GPP TSG RAN WG2 #74, "RAN Overload control of delay tolerant devices in UMTS," QUALCOMM Incorporated, Barcelona, Spain, May 9-13, 2011.

(Continued)

*Primary Examiner* — Kwang B Yao
*Assistant Examiner* — Syed M Bokhari
(74) *Attorney, Agent, or Firm* — Moffat & Co.

(57) ABSTRACT

Methods and network elements partitioning at least a subset of contention based resources for random access attempts into a plurality of partitions, wherein each of said plurality of partitions is associated with at least one precondition governing selection of a partition, the precondition being derived from at least one of: source of causation for the random access attempt, a device state, a device event, a device group, a traffic event, a traffic class, or an application characteristic, and wherein each of said plurality of partitions is further associated with at least one configuration parameter; and communicating configuration parameters for the plurality of partitions and preconditions governing partition usage to at least one of a plurality of user equipments. Also, methods, devices and network elements for communicating on partitions.

12 Claims, 11 Drawing Sheets

(56) References Cited

OTHER PUBLICATIONS

3GPP TSG GERAN #51, " Enhancement on RACH with mixed traffic," ZTE Corporation, Gothenburg, Sweden, Aug. 29-Sep. 2, 2011.
3GPP TSG GERAN #49, "Enhancement on RACH overload control Updated," ZTE Corporation, Chengdu, China, Feb. 28-Mar. 4, 2011.
R2-120545, Research in Motion, "Evaluation of SR for background traffic", 3GPP TSG-RAN WG2 Meeting #77 (Feb. 2012), <<http://www.3gpp.org/ftp/tsg_ran/WG2_RL2/TSGR2_77/docs/R2-120545.zip>>.
3GPP TS 36.211, "Evolved Universal Terrestrial Radio Access Network (E-UTRAN); Physical Channels and Modulation" ,V10.4.0 (Dec. 2011), <<http://www.3gpp.org/ftp/Specs/html-info/36211.htm>>.
3GPP TS 36.300, "Evolved Universal Terrestrial Radio Access Network (E-UTRAN); Overall description; Stage 2" ,V10.5.0 (Sep. 2011), <<http://www.3gpp.org/ftp/Specs/html-info/36300.htm>>.
3GPP TS 36.321, "Evolved Universal Terrestrial Radio Access Network (E-UTRAN); Medium Access Control 11 (MAC) protocol specification" ,V10.4.0 (Dec. 2011), <<http://www.3gpp.org/ftp/Specs/html-info/36321.htm>>.
3GPP TS 36.331, "Evolved Universal Terrestrial Radio Access Network (E-UTRAN); Radio Resource Control 13 (RRC) protocol specification" ,V10.4.0 (DEC. 2011), <<http://www.3gpp.org/ftp/Specs/html-info/36331.htm>>.
3GPP TR 36.822, "Evolved Universal Terrestrial Radio Access Network (E-UTRAN); LTE RAN Enhancements for Diverse Data Applications" ,V0.3.0 (Feb. 2012), <<http://www.3gpp.org/ftp/Specs/html-info/36822.htm>>.
R1-061369, Ericsson, "LTE random-access capacity and collision probability" (May 8-12, 2006, Shanghai, China).
R2-115247, 3GPP TR 36.822 V0.0.1 3rd Generation Partnership Project; Technical Specification Group Radio Access Network; LTE RAN Enhancements for Diverse Data Applications: (Sep. 2011).
R2-116280, "Intel, PUCCH Utilization for Background Traffic" (Nov. 14-18, 2011, San Francisco, USA).
R2-071732, NSN and Nokia, "Differential RACH Access based on Access Classes", 3GPP RAN2 #58 (May 2007).
R2-112817, CATT, Considerations for Evaluation Methods and Simulation Modeling (Barcelona, Spain, May 9-13, 2011).
R2-100207, Huawei, "Sharing PUCCH-SR", 3GPP RAN2 #68bis (Jan. 2010).
R2-062107, Texas Instruments, "Content of initial Unsynchronized RACH access and contention resolution", 3GPP RAN2 #54 (Sep. 2006).
R2-070207, Samsung and NTT DoCoMo, "Pathloss & Size in RACH signature", 3GPP RAN2 #56bis (Jan. 2007).

\* cited by examiner

METHOD AND SYSTEM FOR PARTITIONING CONTENTION BASED RESOURCES IN A WIRELESS NETWORK

FIELD OF THE DISCLOSURE

The present disclosure relates to wireless communications and in particular to the allocation of contention based uplink resources for wireless communications.

BACKGROUND

In order to communicate with a network, a wireless user equipment (UE) needs to acquire uplink and downlink resources for such communications. A UE initiates a connection with a network when it has data to transmit on the uplink or when it is made aware that there is downlink data to be received. If the UE has no connection with the network the UE may initiate a connection via a contention based channel where transmissions from various UEs may collide. In other cases, a UE with an established connection to the network may not have dedicated resources available to transmit user data on the uplink and may request resources to transmit the user data using either a contention based uplink channel or a dedicated uplink control channel. For example, in a $3^{rd}$ Generation Partnership Project Long Term Evolution (3GPP LTE) system, this is typically done through physical uplink control channel (PUCCH) resources, when dedicated resources are provided to each UE communicating with the network element, or through a contention based physical random access channel (PRACH) between the UE and the network element when the UE is not provided with a PUCCH. The use of a dedicated uplink control channel for uplink resource requests limits the number of UEs that can be served by a network element, since such dedicated resources are scarce while time sharing these dedicated resources will result in significant latency if these resources are shared by a large number of UEs. If a random access channel is used instead of a dedicated channel, the likelihood of collisions between different transmitting UEs increases as the number of UEs utilizing such random access resource increases.

Further, each UE runs different applications and may have different data needs. In particular, a UE that is streaming audio or video may use significant data resources. However, other data devices may have applications that only sporadically exchange data. Thus, these UEs generate small bursts of sporadic traffic, followed by a period of inactivity. The sporadic traffic pattern may be present for an extended period of time, perhaps for as long as the UE is powered on. This pattern of behaviour, often referred to as a low-activity traffic, may be generated, for example, by background applications.

The increased adoption of smartphones results in an increasing number of UEs with diverse data applications (DDA) and correspondingly diverse traffic demands. While existing radio resource management mechanisms, such as those of the $3^{rd}$ Generation Partnership Project (3GPP) Long-Term Evolution (LTE) systems, may be efficient in handling continuous streams of traffic for multimedia applications, such systems are less efficient for supporting low activity traffic from a number of always connected wireless devices such as smartphones, tablets, laptop computers and remote sensors.

BRIEF DESCRIPTION OF THE DRAWINGS

The present disclosure will be better understood with reference to the drawings, in which.

DETAILED DESCRIPTION OF THE DRAWINGS

Figure 1:
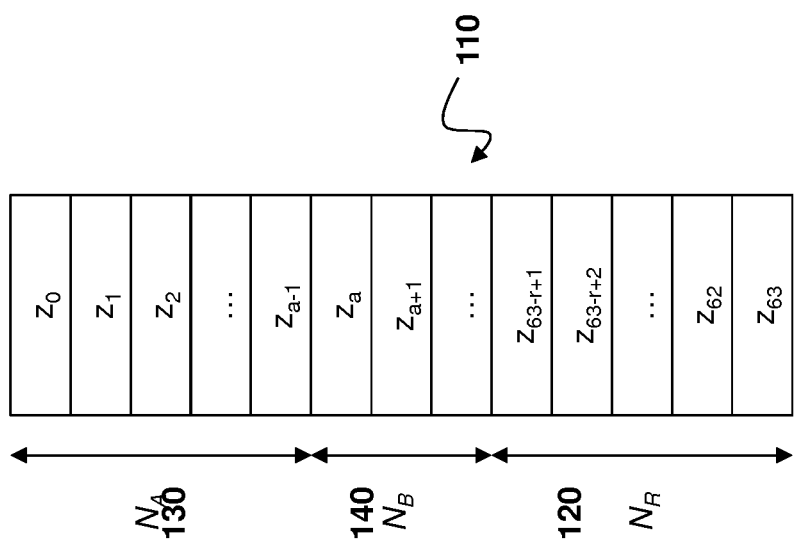
FIG. 1 is a block diagram showing random access preamble configuration in an LTE physical random access channel.

The present disclosure provides methods for managing the selection of contention based resources for random access attempts from a plurality of user equipments and managing contention based resources used for random access attempts.

In particular, the present disclosure provides a method at a network node in a wireless communications network, the method comprising: partitioning at least a subset of contention based resources for random access attempts into a plurality of partitions, wherein each of said plurality of partitions is associated with at least one precondition governing selection of a partition, the precondition being derived from at least one of: source of causation for the random access attempt; a device state, a device event, a device group, a traffic event, a traffic class, or an application characteristic, and wherein each of said plurality of partitions is further associated with at least one configuration parameter; and communicating configuration parameters for the plurality of partitions and preconditions governing partition usage to at least one of a plurality of user equipments.

The present disclosure further provides a network node operating in a wireless communications system, the network node comprising: a processor; and a communications subsystem, wherein the processor and communications subsystem are configured to: partition at least a subset of contention based resources for random access attempts into a plurality of partitions, wherein each of said plurality of partitions is associated with at least one precondition governing selection of a partition, the precondition being derived from at least one of: source of causation for the random access attempt; a device state, a device event, a device group, a traffic event, a traffic class, or an application characteristic, and wherein each of said plurality of partitions is further associnicate configuration parameters for the plurality of partitions and preconditions governing partition usage to at least one of a plurality of user equipments.

The present disclosure further provides a method for operating a user equipment in a wireless communications network for selecting a contention based resource, from a plurality of contention based resources, the method comprising: determining that the selecting of the contention based resource is associated with a configured precondition at the user equipment; selecting a contention based resource within a partition associated with a precondition wherein the precondition comprises at least one of: a user equipment state, a user equipment event, a user equipment group, a traffic event, a traffic class, or an application characteristic; and transmitting using the selected contention based resource.

The present disclosure further provides a user equipment operating in a wireless communications system for selecting a contention based resource from a plurality of contention based resources, the user equipment comprising: a processor; and a communications subsystem, wherein the processor and communications subsystem are configured to: determine that the selecting of the contention based resource is associated with a configured precondition at the user equipment; select a contention based resource within a partition associated with a precondition wherein the precondition comprises at least one of: a user equipment state, a user equipment event, a user equipment group, a traffic event, a traffic class, or an application characteristic; and transmit using the selected contention based resource.

The present disclosure further provides a method at a network node, comprising: receiving a transmission on a contention based resource in a partition, the partition being from a plurality of partitions configured by the network node; and responding to the transmission on the contention based resource within a time and using a priority based on the partition over which the transmission was received.

The present disclosure further provides a network node operating in a wireless communications system, the network node comprising: a processor; and a communications subsystem, wherein the processor and communications subsystem are configured to: receive a transmission on a contention based resource in a partition, the partition being from a plurality of partitions configured by the network node; and respond to the transmission on the contention based resource within a time and using a priority based on the partition over which the transmission was received.

The present disclosure further provides a method at a user equipment, comprising: transmitting using a contention based resource on a partition, the partition being from a plurality of partitions configured by a network node; and waiting for a response from the network node to the transmission for a preconfigured period of time, wherein the preconfigured period of time is chosen based on the selected partition. In one embodiment the method further comprises retransmitting a configured number of times if no response is received from the network node, wherein the configured number of times is based on the selected partition. In a further embodiment, the method comprises transmitting on a different partition after the configured number of times.

The present disclosure further provides a user equipment operating in a wireless communications system, the user equipment comprising: a processor; and a communications subsystem, wherein the processor and communications subsystem are configured to: transmit using a contention based resource on a partition, the partition being from a plurality of partitions configured by a network node; and wait for a response from the network node to the transmission for a preconfigured period of time, wherein the preconfigured period of time is chosen based on the selected partition.

While the description below is presented with regard to a Long Term Evolution (LTE) network, this is not meant to be limiting and the present methods and systems could equally be used with other types of networks having contention based resource requests.

In an LTE system, a UE may be either in a radio resource control (RRC) connected state or an RRC idle state. An RRC-connected UE, also called a connected mode UE, maintains connections with the network, along with a corresponding context held by both the UE and the network. When maintaining a connection to the evolved node B (eNB), the UE may be configured to periodically send information such as channel quality indication to the network on the uplink. This in turns requires periodic allocation of dedicated uplink control channel resources to the UE by the serving eNB. A dedicated physical uplink control channel (PUCCH) resource may include an allocation that allows the UE to send a scheduling request (SR) to the eNB whenever the UE has buffered data that is pending transmission on the uplink and requires the grant of a physical uplink shared channel (PUSCH) resource in order to transmit the data to the eNB.

A UE in an RRC-idle state, also referred to as an idle mode UE, does not maintain its connections with the eNB, thereby allowing the eNB to release all radio resources associated with the UE. User plane data transfer is not possible in an idle mode under current LTE configurations. However, the UE still reads the paging channels and whenever the UE receives a paging message from the eNB on the downlink, or whenever the UE has buffered data that is pending transmission on the uplink and requires the grant of a PUSCH resource in order to transmit the data to the eNB, the UE uses the physical random access channel (PRACH) to send a service request to the eNB. Typically this results in the instantiation of the necessary context information both the UE and the network and the subsequent establishment of a connection between the UE and the eNB, enabling the transmission of data to and from the UE.

In order to support such PRACH activity, an LTE eNB may configure one or more PRACH resources per 10 ms frame. Each PRACH resource occupies six resource blocks (RBs) in the frequency domain and two slots in the time domain. The number of PRACH resources per frame and the location of each PRACH resource are defined by the eNB through information elements, including the RadioResourceConfigCommon; the PRACH-ConfigSIB; or the PRACH-ConfigIndex, all within System Information Block type 2.

Reference is now made to FIG. 1, which shows a block diagram of a random access preamble configuration in PRACH. Each PRACH resource 110 supports 64 random access (RA) preambles, labeled as $z_0 \ldots z_{63}$ in the example of FIG. 1. Further, each preamble $z_i$ is a cyclically shifted Zad-off-Chu sequence generated from a root sequence defined by various information elements within SystemInformation-BlockType2, including the RadioResourceConfigCommon/PRACH-ConfigSIB/rootSequenceIndex, among others.

Within each PRACH resource 110, the eNB configures the use of the preambles through RadioResourceConfigCommon or the RACH-ConfigCommon in the SystemInformation-BlockType2. Further, of the 64 RA preambles, the eNB may reserve a first number of preambles for explicit assignments to UEs. This may be used, for example, for contention free use during handovers. Thus, a UE that is near a cell edge may be provided with a dedicated RA preamble so that the handover procedure operates smoothly. The reserved preambles are designated as $N_R$ in FIG. 1, and are shown by arrow 120.

Further, of the remaining preambles, the eNB may further assign a certain number of preambles into a first Group A and a second Group B. The preambles assigned to Group A are designated as $N_A$ in FIG. 1 and shown by reference numeral 130 and the preamble designated for Group B are designated as $N_B$ and are shown in FIG. 1 with arrow 140. As seen in FIG. 1, $N_R+N_B+N_A=64$.

Further, two additional parameters, namely message Size-GroupA and messagePowerOffsetGroupB are defined to control whether a UE selects a preamble from Group A or Group B.

Figure 2:
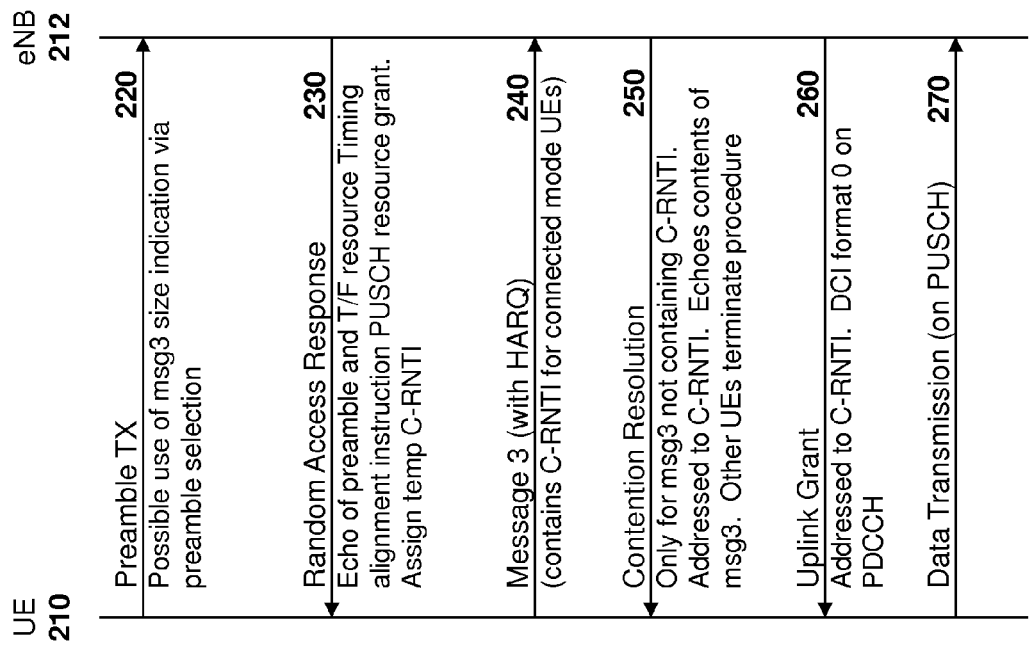
FIG. 2 is a data flow diagram showing the LTE random access procedures.

For random access in LTE, contention based random access by a UE follows the process of FIG. 2. Reference is now made to FIG. 2.

As seen in FIG. 2, UE 210 communicates with eNB 212. UE 210, using the RACH configuration broadcast by the eNB as described above with regard to FIG. 1, determines an appropriate group for its service request, specifically group A or group B, and randomly selects a preamble from the group. The UE determines the next available subframe containing a PRACH resource as defined by the prach-ConfigIndex and transmits the selected preamble in the selected PRACH resource, as shown by arrow 220 in FIG. 2.

Upon detection of a preamble transmitted in a PRACH opportunity, eNB 212 sends a Random Access Response (RAR) in the physical downlink control channel (PDCCH) addressed to the random access radio network temporary identifier (RA-RNTI) associated with the selected preamble. RAR signals uplink timing adjustment information and an uplink resource allocation for the PUSCH along with a temporary cell radio network temporary identifier (C-RNTI). The RAR is shown by message 230 in FIG. 2.

The delay between the receipt of the preamble 220 and the sending of the random access response may be between 2 and 12 ms in one embodiment of a Release 10 LTE network. In addition, the RAR message may also contain a back off indicator which the eNB can set to instruct the UEs to spread out the period of time that a UE waits before attempting another RACH attempt. This is useful in case of congestion on RACH which might lead to repeated collisions on the RACH resources when too many UEs simultaneously initiate RACH access.

UE 210 receives the random access response and, using the allocated PUSCH resource, the UE transmits its assigned Radio Network Temporary Identifier to the eNB. The assigned Radio Network Temporary Identifier may be the C-RNTI if the UE already has one, or a subscriber identity otherwise. The transmission of the Radio Network Temporary Identifier is accompanied by an additional access message (msg3). Typically, the initial access message is a buffer status report (BSR) to request additional uplink transmission opportunities. The msg3 is shown by reference numeral 240 in FIG. 2. The time between the random access response receipt and the sending of the msg3 is at least 5 ms.

The eNB 212 next acknowledges reception of the message and may send a contention resolution message addressed to the temporary C-RNTI of the requesting UE in the case of UEs having no assigned C-RNTI such as an Idle mode UE. This is shown by arrow 250 in FIG. 2.

In the case of a connected mode UE, that is a UE with an assigned C-RNTI, eNB 212 may actually send a PDCCH grant addressed to the C-RNTI of the UE instead of the contention resolution message 250. The PDCCH grant gives access to a PUSCH resource.

Subsequent to message 250, the eNB 212 then sends an uplink grant addressed to the C-RNTI of UE 210, as shown by message 260 and UE 210 may then use a physical uplink shared channel (PUSCH) for data transmission, as shown by message 270.

Various parameters of the messages in FIG. 2 may be configured by eNB 212 through the RadioResourceConfig-Common/RACH-ConfigCommon in the SystemInformationBlockType2. For example, the ra-ResponseWindowSize defines the maximum duration of the RAR window following a preamble transmission. Further, a mac-ContentionResolution Timer defines the maximum duration of the contention resolution window following a transmission of the msg3 at arrow 240. Further, the preambleTransMax defines the maximum number of preamble selections and transmissions allowed in a single random access attempt.

While the above provides for access for many UEs, collisions may occur which will increase the latency of a random access procedure since collisions result in the need to resend a new preamble message 220. The network may reduce the latency of the random access procedure by pre-assigning one RACH preamble that is dedicated to a particular UE. Such assignment may be used, for example, when an LTE UE that does not have resources on a scheduling request physical channel allocated to the UE needs to indicate a scheduling request. In this case, the UE performs a random access procedure, and by using the pre-assigned PRACH preamble can avoid collisions and hence avoid the need for contention resolution, thereby reducing the latency of the scheduling request. Pre-assigning the PRACH preambles may also be used to reduce the latency of a handover.

Contention-free RACH procedures have the same first steps as a contention based RACH procedure, but the procedure terminates when the UE receives the RAR. If the eNB receives the PRACH preamble explicitly assigned to the UE, the eNB knows that no other UE should be assigned that PRACH preamble and so there is no need for the eNB to transmit a contention resolution message. The RACH procedure may therefore be terminated once the UE receives the RAR at message 230.

In LTE Release 8 specifications, the purpose of dedicated signalling of individual PRACH resources is to support contention free RACH procedures. A UE can only use one preamble when the network reserves RACH resources for the UE in a contention free RACH procedure, and the RRC signalling allocates the PRACH preamble to the UE.

Further, in some embodiments a UE may contend for RACH resources when indicating a service request even while the UE is in an RRC connected state. In some of these cases, a UE may not be allocated a PRACH preamble using dedicated signalling. The RRCConnectionReconfiguration message allocates a PRACH preamble to a UE through the mobilityControlInfo information element (IE). However, the mobilityControlInfo IE is included only for handovers, and the rach-ConfigDedicated information element within the mobilityControlInfo IE that is used to allocate a preamble to the UE is optional and may not be included in some instances. A UE that is handing over to another cell (the target cell) determines the PRACH preamble configuration by monitoring common signaling from the target cell such as through a SystemInformationBlockType2. When a UE that is not assigned a dedicated preamble is handed over from another cell, the UE accesses its target cell by randomly selecting a preamble from among the multiple PRACH preambles; those preambles are provided to the UE using common signalling. In other cases, a UE in connected mode may lose synchronization with its serving cell. To re-establish synchronization, the UE follows the contention based random access procedures and accesses its serving cell by randomly selecting a preamble from among the multiple PRACH preambles provided to the UE. using common signalling.

Based on the above, the UE can access the uplink resources either through dedicated PUCCH resources, or through contention based or contention free RACH procedures, while either in an idle mode or a connected mode.

In addition to the large volumes of data exchanged between user equipments and networks by multimedia applications, some UEs with packet data capabilities may generate small bursts of sporadic traffic followed by a period of inactivity. This type of traffic may be present for an extended period of time and may, for example, be present for as long as a UE is powered on. Such behavior is sometimes referred to as low-activity traffic and may be generated, for example, by background applications.

Increased adoption of smartphones may result in an increased number of UEs with diverse data applications and correspondingly diverse traffic demands. As indicated above, while LTE systems may be efficient for high volume data throughput, they are not at present efficient at handling low activity traffic from a large number of always connected wireless devices such as smartphones, tablets, laptop computers and remote sensors.

In the case of low activity traffic, a UE that generates such low activity traffic may be treated as either a device held in a connected-mode or as a device mainly held in idle-mode with transitions to connected mode whenever user plane data needs to be exchanged.

In idle mode, the idle mode requires no radio resources dedicated to a UE. However, frequent transitions between idle mode and connected mode may incur high signalling costs and associated latency in order to re-establish contexts and to return a UE to a connected mode so that it can transfer its buffered data. In many cases, the volume of signalling traffic may significantly exceed volumes of low activity traffic that are generated by background applications.

If the UEs, on the other hand, are maintained in a connected mode, this requires a large proportion of system resources to be reserved for the physical uplink control channel for the Scheduling Request (SR) and Channel Quality Indicator (CQI). If PUCCH resources are allocated more frequently, this will use up network resources. If PUCCH resources are allocated less frequently, this will increase latency.

Another option to minimize the resources needed is to not assign dedicated PUCCH resources for SR to such UEs.

In particular, as described in 3GPP Technical Specification (TS) 36.300, "*Evolved Universal Terrestrial Radio Access Network (E-UTRAN); Overall description; Stage 2*", V10.5.0 (2011-09), the contents of which are incorporated herein by reference, procedures allow for the release of dedicated uplink control channel resources whilst still in RRC connected state. This is referred to herein as a quiescent mode. As in an idle mode, the UE must use a physical random access channel (PRACH) and procedures described above to send a service request to the eNB whenever the UE requires the grant of uplink resources. In this case, however, minimal signalling is required to re-establish connections since the context of those connections is maintained by both the UE and the eNB. Thus, the use of PRACH for SR may be one way of avoiding the reserving of a large portion of system resources for PUCCH SR. However, PRACH is intended to be used by UEs in current LTE specifications when the UEs are attempting a time-sensitive network access such as an initial establishment of an RRC connection from an idle mode or entry into a new serving cell during handover. PRACH may also be used for UEs to recover from a radio link failure following the loss of synchronization between the UE and the eNB.

Various PRACH configurations, each requiring a different amount of PRACH resources in each frame, are available to allow an eNB to provision for an aggregate rate of PRACH requests. Typically, given an expected number of requests per unit time, an eNB picks a PRACH configuration that provides the number of PRACH resources per unit time required to meet a target collision probability and a resulting distribution of latency for responding to the UE PRACH requests. Based on this, for a given PRACH configuration, any UE that picks a preamble at random experiences a latency and retransmissions according to the same probability distribution.

However, because PRACH is intended to support time-sensitive network access functions, existing PRACH configurations are designed to provide a low probability of collision and typically the probability is around 1%. Further, the design of PRACH configurations are also created for low latency. In order to provide better performance during handover, an eNB may provide an incoming UE with a dedicated PRACH preamble to avoid collisions and minimize latency, which is referred to above as contention-free random access.

Thus, while the PRACH may be an efficient mechanism to serve some diverse data application traffic, some applications have requirements that are different from those of time-sensitive network access functions that the PRACH was originally intended to serve. Such diverse applications lead to a number of practical difficulties.

First, different applications have different traffic patterns and have different latency requirements. Dimensioning of a common set of PRACH resources based on a target probability of collision and expected traffic load is difficult with a heterogeneous mix of requirements. Provisioning resources to meet the most demanding application requirements can lead to gross over-dimensioning of PRACH resources while provisioning resources to meet less demanding application requirements can lead to unacceptable latencies for time-sensitive network access functions.

In a second consideration, at the time of configuration it may not be possible to predict what application among the many types of applications supported by a particular UE will be the next to request a service. For example, an interactive session may be started on a UE that was previously only running background applications. Further, at some other point in time, a screen of the UE may be locked to terminate the interactive session within the same UE. As a result, it may not be possible to predict when a UE will need an uplink grant and what the UE will need the uplink grant for.

A third consideration is that, due to the PRACH also serving time-sensitive network access functions such as handover and initial attachment, the impact on those services resulting from the tailoring of a PRACH configuration for diverse traffic may be considered. In particular, using a PRACH for scheduling requests may increase the volume of random access requests compared to the primary use of PRACH for initial attachment. The increased volume may not be efficiently served by limited mechanisms that are currently available in LTE.

Accordingly, the present disclosure provides for the configuration of a random access resource partition. A partition, as used herein, is a subset of available random access resources. The partitions may then be used by various UEs for diverse classes of traffic and events.

Dimensioning of the random access resource partitions is based on the collision probabilities and associated latencies that can be tolerated by the UEs and applications for use on those partitions. In turn, this enables the eNB and the UE to take into account the associated delays on each partition and tailor various timers associated with the RACH procedures to the expected collision probability and/or a priority for a given partition.

In the embodiments below, uplink contention channel configuration options are augmented to provide random access opportunities for different classes of uplink traffic, for various UE-detected events, and/or for different groups of UEs, while at the same time minimizing the overall radio resources allocated to the random access channel and allowing a large population of UEs to share the random access resources.

While the embodiments described below are described with regard to LTE Physical Random Access Channel (PRACH), any other uplink contention channel may be used. For example, the LTE PUCCH SR resources may be adapted to be used as a contention-based medium. While the embodiments described below are described with regard to the LTE PRACH as the exemplary uplink contention channel along with the corresponding PRACH configuration and random access procedures, this is not meant to be limiting and the present disclosure could be expanded to other channels.

Random Access Preamble Partition Configuration and Signalling

In accordance with one embodiment of the present disclosure, an eNB may partition the random access preambles in a PRACH so that some preambles are reserved for use by time-sensitive network access functions while other preambles are reserved for supporting UE-related events and uplink traffic that are delay tolerant. The eNB can configure the number of preambles available in each partition to meet a target collision probability, and associated access latency, that is appropriate to the motive for each random access. The segregation of preambles according to target access latency ensures that demands for one random access category do not negatively impact the performance of another random access category.

In particular, some events that trigger a random access attempt occur infrequently and only require a few preambles per frame to meet their target collision probability. By partitioning a PRACH resource, an eNB can avoid the radio resource overhead that would otherwise result from dedicating an entire PRACH resource to each random access category. In particular, a PRACH resource of 6 resource blocks over 2 slots contains 64 preambles. However, in some cases 64 preambles are not required for a single random access category and thus the PRACH resource can be partitioned for use by a number of random access categories so that different partitions possibly have a different numbers of preambles.

In order to facilitate random access on different preamble partitions, the eNB configures available RACH resources in a cell into various partitions and signals these configurations to the UEs.

In one example, each PRACH preamble partition definition may contain some or all of the information in accordance with Table 1 below.

TABLE 1

| Information | Definition |
|---|---|
| | Preamble Definitions |
| PRACH resources | the number and location of PRACH resources. This is equivalent to the information element PRACH-Config defined by LTE |
| Preamble information | the parameters governing generation of random access preambles. This is equivalent to the information element RACH-ConfigCommon/preambleInfo defined by LTE |

TABLE 1-continued

| Information | Definition |
|---|---|
| | Preamble Definitions |
| PRACH mask | the PRACH resources where this partition may be used. This is equivalent to the information element ra-PRACH-MaskIndex defined by LTE |
| Starting preamble | the first preamble allocated to this partition within the specified PRACH resources |
| Number of preambles | the number of preambles allocated to this partition within the specified PRACH resources |

Thus, in accordance with Table 1, PRACH resources, preamble information, PRACH masks, starting preambles and a number of preambles may be defined for each partition.

In some alternatives, with one physical random access channel, all PRACH preamble partitions are derived from a common PRACH configuration as defined by PRACH resources and preamble information from Table 1 above. In other alternatives, with multiple physical random access channels, different PRACH preamble partitions may be derived from different PRACH configurations. For example, some PRACH resources may be dedicated to certain PRACH preamble partitions according to the number of preambles required to meet a target probability of collisions. In other alternatives, a PRACH preamble partition may be distinct and encompass random access preambles that are only used within that partition. In other alternatives, a PRACH preamble partition may overlap with another partition and include some number of shared preambles.

In various embodiments, a partition dimensioned with a higher probability of collision may be configured with a maximum number of retransmissions greater than that of a partition dimensioned with a lower probability of collision. Further, in some alternatives, a partition dimensioned with a higher probability of collision may also be configured with a back off interval greater than that of a partition dimensioned with a lower probability of collision.

In other alternatives, the timing between steps in the random access procedure may be configured to ensure that the timers associated with random access attempts in a partition intended to serve higher priority events or traffic are shorter than those of a partition associated with lower priority events or traffic.

Figure 3:
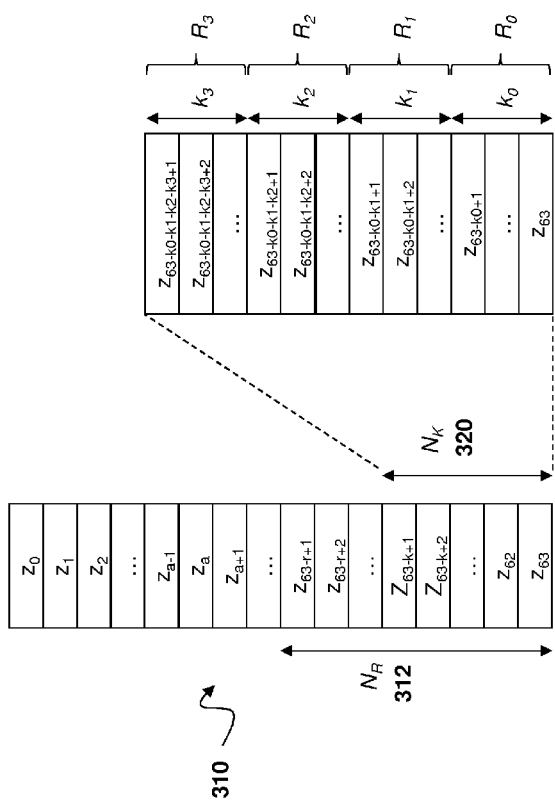
FIG. 3 is a block diagram showing random access preamble partitions in a physical random access channel.

Reference is now made to FIG. 3. As seen in FIG. 3, a set of PRACH preambles 310 includes 64 preambles, having an $N_R$, as shown by arrow 312, designating the reserved preambles.

Out of the $N_R$ space, a set of preambles, $N_K$, shown by arrow 320, may be designated for preamble partitions. Thus, $N_K$ preambles may be assigned by the eNB to random access resource requests related to some type of UE traffic or events. As shown in FIG. 3, the $N_K$ preambles are a subset of the $N_R$ preambles reserved for use by the eNB. Legacy UEs that have not been explicitly assigned a dedicated preamble by the eNB are prohibited from selecting the random access preambles from within the reserved space of $N_R$ preambles, thus ensuring backward compatibility.

In some embodiments, the eNB may assign a subset of $k_i$ preambles within the set of $N_K$ preambles to a partition $R_i$ that is to be used by a UE to request service for a particular class of traffic, event, state or group. The number of partitions, i, may be more than one in some PRACH resources.

Thus, for example, in the embodiment of FIG. 3, four partitions are created, namely $R_0$, $R_1$, $R_2$ and $R_3$. Each partition has a number of preambles, designated by $k_0$, $k_1$, $k_2$ and $k_3$.

Partition masks may also be utilized in accordance with one embodiment of the present disclosure. In particular, the prach-ConfigIndex specified by an eNB may define multiple PRACH resources per frame. For example, PRACH configuration index 9 defines a PRACH resource in subframes 1, 4 and 7 of every subframe. In some alternatives, an eNB provides a UE with a set of partition mask tuples ($R_i$, $M_i$) indicating that partition $R_i$ should only be used in the configured PRACH resource defined by the mask $M_i$.

By associating a PRACH mask with a partition $R_i$, the eNB can control which types of random access requests are allowed in each PRACH resource, thereby distributing RA requests over the available PRACH resources and minimizing the impact on time-sensitive network access requirements.

Figure 4:
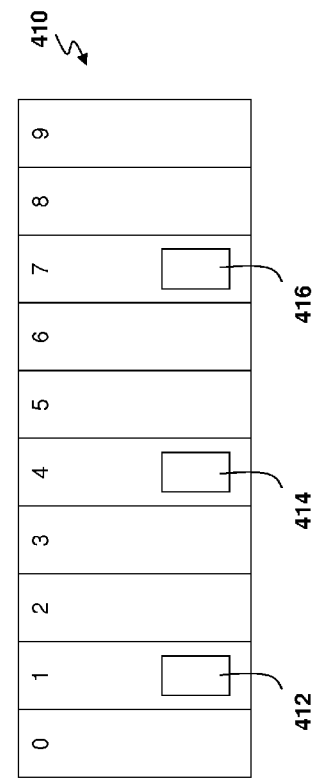
FIG. 4 is a block diagram showing a typical physical random access channel configuration.

Reference is now made to FIG. 4 which shows a frame 410 having a PRACH resource 412 configured in subframe 1, a PRACH resource 414 configured in subframe 4 and a PRACH resource 416 configured in subframe 7. Depending on the mask associated, the UE may use PRACH resources in any of subframes 1, 4 or 7, or a subset thereof.

For example, if the PRACH mask index is 0 is associated with a partition $R_i$, all preambles of partition $R_i$ are available in all of the PRACH resources of the frame. Similarly, associating the PRACH mask index 12 with partition $R_i$ makes preambles of partition $R_i$ available in odd PRACH resources of the frame. Thus, in FIG. 4, if a mask index 12 was utilized then the UE could use PRACH resources in odd subframes, meaning subframes 1 and 7. However, with the mask index set to 12, the UE could not use the PRACH resources in subframe 4.

Associating RACH Partitions with Reasons for Partition Usage

Once the partitions have been created, each partition may be provided with a usage reason to allow a UE to select which partition is most appropriate for the type of traffic that is to be sent. A set of PRACH preamble partition usage policies may be used to govern the conditions under which each partition may be used and each partition usage policy may comprise various information. For example, reference is now made to Table 2 below.

TABLE 2

| Partition Usage Policy | |
| --- | --- |
| Information | Definition |
| Reason | the event that caused a random access to be initiated or a current condition at the UE |
| Reason priority | a priority level associated with this reason |
| Allowed partitions | the preamble partitions that may be used for this reason |

As seen in Table 2, the reason for selecting a preamble partition may be based on the event that caused a random access to be initiated or it may be based on a current condition at the UE.

Further, reason priority includes a priority level associated with the reason and the allowed partitions indicates the partitions that may be used for the reason.

In other embodiments, the reason may be mapped to a preamble partition that is used exclusively for that reason. In other alternatives, multiple reasons may be mapped onto and may share a single partition. This association of partitions to specific reasons gives the eNB control over the expected latency of a random access attempt. For instance, all the reasons corresponding to a higher priority event or state at the UE may be associated with a RACH partition having a lower probability of collision and, thus, a lower expected latency.

In other alternatives, the eNB may provide a UE with a set of partition usage tuples ($r_j$, $R_i$) indicating that the partition $R_i$ should be used whenever the UE determines a reason $r_j$ is valid when initiating a random access. In other alternative embodiments, the set of partition usage tuples may be transmitted by the eNB to all UEs over a broadcast downlink channel; in other alternative embodiments, a set of partition usage tuples may be transmitted by the eNB to an individual UE over a unicast downlink channel.

In other alternatives, a set of partition usage tuples may be pre-configured into a UE.

Thus, in accordance with one embodiment of the present disclosure, the PRACH partition to be used when selecting and transmitting a random access preamble may be assigned to the UE, or may be chosen based on the class of uplink traffic or a UE detected event that triggers the random access attempt, or in some embodiments may be based on the current state of the UE or of its applications, or may be based on a grouping of UEs according to some classification rules. In other embodiments, an eNB also provides a UE with a set of reason priority level tuples ($r_j$, $l_j$) indicating that the reason $r_j$ has been assigned a priority level $l_j$ for use when prioritizing amongst a number of simultaneously determined partition selection reasons. In one embodiment, the priority levels may be distinct such that the priority level for $l_m \ne l_n$ if m≠n to prevent ambiguity in the UE partition selection processes. The set of reason priority level tuples, may, in some embodiments be pre-configured onto the UE.

In accordance with one embodiment of the present disclosure, backward compatibility with legacy UEs is provided by allocating a portion of the reserved preamble space to the various PRACH partitions. Thus, legacy UEs would still operate normally by using the $N_A$ or $N_B$ preambles, while UEs implementing the embodiments of the present disclosure could use a portion of the reserved space $N_R$ for random access.

In one embodiment, once the UE has selected and transmitted a selected RA preamble in the selected PRACH preamble partition, the UE may monitor the physical downlink control channel (PDCCH) for a random access response from the eNB for a period defined by a response window size that has been configured for the selected partition.

In other embodiments, once the UE has transmitted a msg3, the UE monitors the PDCCH for a downlink transmission addressed to the UE for a period defined by the contention resolution timer that has been configured for the selected partition.

In other embodiments, if the UE fails to receive positive confirmation that a preamble transmission was received and has not reached the maximum transmissions that have been configured for the selected partition, the UE may then start a backoff timer based on the backoff interval that has been configured for the selected partition.

The selection criteria may be based on various criteria, including traffic class, traffic event, device group, device event, device state, application characteristic, or assignment to the UE, among other factors. Each is discussed below.

Regarding traffic class, in some embodiments the LTE PRACH configuration options are augmented with partition information to provide potentially different random access opportunities for different classes of uplink traffic. These augmented PRACH configurations allow the selection of a random access preamble from a PRACH preamble partition that meets the latency requirements of the traffic while, at the same time, ensuring that the random access does not impact time-sensitive network access functions related to handover and initial attachment by other UEs.

In one embodiment, the traffic class may be derived from the Logical Channel Group associated with a UE's uplink buffer. In other embodiments, where the UE has data in at least one of its buffers and requires an uplink grant, the UE may choose a random access preamble from the PRACH preamble partition associated with that buffer or associated with a logical channel from the logical channel group, such as the logical channel having data to transmit that has the highest priority.

In other embodiments, the traffic class may be derived from the Logical Channel associated with the buffered uplink traffic. In other embodiments, Logical Channels are assigned to Logical Channel Groups for classification.

In one embodiment, the traffic class may be derived from priority of the Logical Channel associated with the buffered uplink traffic.

In other embodiments, the traffic class may be derived from the quality of service class identifier (QCI) or other possible quality of service labels.

In other embodiments, the traffic class may be derived through the matching of buffered uplink traffic to a predefined template. The template may, for example, define elements of an internet protocol (IP) packet and how they map onto traffic classes.

In some embodiments, an eNB provides a UE with a set of reason selection criteria $(r_j, C_j)$ indicating the preconditions $C_j$ that constitute the reason $r_j$ for selecting a partition. In other embodiments, the set of reason selection criteria $(r_j, C_j)$ is pre-configured onto the UE.

Some traffic class reasons use a single value precondition and examples may include the enqueuing of traffic associated with a logical channel or logical channel group.

TABLE 3

Traffic Class Reasons with single-value precondition

| Information | Definition |
|---|---|
| $r_j$ | (r_trafficClass-LC, rUID) or (r_trafficClass-LCG, rUID) |
| $C_j$ | Logical Channel or Logical Channel Group identifier. The association between Logical Channels and Logical Channel Groups may be either configured by the eNB or pre-configured into the UE. Selection of the reason at the UE is made by simply matching the LC or LCG buffer where the traffic was enqueued with the LC or LCG identifier |

As seen in Table 3 above, the reason could include the traffic class logical channel or traffic class logical channel group along with a unique reason identifier (rUID).

Similarly, the precondition could include various indications including logical channel or logical channel group identifier. Further an association between logical channels and logical channel groups may either be configured by the eNB or pre-configured onto the UE. Selection of the reason at the UE may be made by matching the logical channel or logical channel group buffer where the traffic was queued with the logical channel or logical channel group identifier.

In other embodiments, the traffic class reasons may use multi-value preconditions. Example might include IP packet filters. Reference is now made to Table 4.

TABLE 4

Traffic Class Reasons with multi-value precondition

| Information | Definition |
|---|---|
| $r_j$ | (r_trafficClass-Filter, rUID) |
| $C_j$ | selected IP packet fields and matching values. The fields to match and their values are either configured by the eNB or pre-configured into the UE. Selection of the reason at the UE is made by matching an enqueued IP packet with the packet filter |

As seen Table 4, the reason can include the traffic class filter with a unique reason identifier as well as preconditions including selected IP packet fields and matching values.

Thus, in accordance with one embodiment of the present disclosure, the selection of the partition may be based on a traffic class reason that is either based on single value preconditions or multi-valued preconditions.

In a second aspect, the selection may be based on a traffic event. Thus, in some embodiments, the LTE PRACH configuration options are augmented with partition information to provided random access opportunities in response to different traffic related events detected at the UE. These augmented PRACH configurations allow the selection of a random access preamble from a PRACH preamble partition that matches the event that initiated the service request. For example, in one embodiment, the selection of a PRACH preamble partition is based on certain thresholds and timers which are used to define traffic related events. These events may include the amount of data in a Logical Channel Group uplink buffer rising above, or dropping below, a threshold; the amount of data in a Logical Channel uplink buffer rising above, or dropping below, a threshold; the arrival of traffic in the buffer of a channel with a semi-persistent scheduling when uplink data is buffered but a number of previously empty transmission opportunities have caused implicit release of the uplink allocations; the arrival of traffic in a buffer of a channel with high priority when the time to the next PUCCH service request (SR) opportunity exceeds the latency bound of traffic associated with the channel; expiration of a timer after which buffered data can be sent from a particular Logical Channel Group; expiration of a timer after which buffered data can be sent from a particular Logical Channel; expiration of a timer after which a new random access can be sent using a higher priority partition; a time since last uplink grant rising above, or dropping below, a threshold; time since last downlink transmission reception rising above, or dropping below, a threshold; a number of successive random access failures on a particular PRACH preamble partition exceeding a threshold; or a MAC reset or reconfiguration, among other examples.

When a configured event is detected, the UE may choose a random access preamble from a PRACH preamble partition referenced by the mapping that was either provided by the eNB or preconfigured onto the UE. In some embodiments, traffic events are assigned to traffic event groups for classification.

Using the reason precondition criteria above, some traffic event reasons may use a single value precondition. An example may include timers and error counters and may be defined in Table 5:

TABLE 5

Traffic Event Reasons with single-value precondition

| Information | Definition |
|---|---|
| $r_j$ | (r_trafficEvent-Timer, rUID) or (r_trafficEvent-Counter, rUID) |
| $c_j$ | timer or counter value. The values are either configured by the eNB or pre-configured into the UE and are used to initialise the corresponding timer or counter. Selection of the reason at the UE is made when the timer or counter reaches the designated value |

In Table 5, the single value precondition may be timers or counters and configured by the eNB or pre-configured onto the UE.

In other embodiments, the traffic event reasons may use threshold counters with hysteresis. In particular reference is made to Table 6:

TABLE 6

Traffic Event Reasons using Threshold Counters

| Information | Definition |
|---|---|
| $r_j$ | (r_trafficEvent-Threshold, rUID) |
| $c_j$ | high-watermark value, low-watermark-value. The values are either configured by the eNB or pre-configured into the UE and are used to initialise the corresponding high- and low-watermarks. Selection of the reason at the UE is made when a counter crosses the designated watermark values |

From Table 6, the preconditions may include a high-watermark and a low-watermark-value and the values are either configured by the eNB or pre-configured onto the UE.

In other embodiments, some traffic event reasons may use a multi-value precondition. Examples may include token bucket overflows, for example. Reference is now made to Table 7:

TABLE 7

Traffic Event Reasons with multi-value precondition

| Information | Definition |
|---|---|
| $r_j$ | (r_trafficEvent-Overflow, rUID) |
| $c_j$ | bucket identifier, token bucket limit. The values are either configured by the eNB or pre-configured into the UE and are used to initialise the token bucket limit for the identified token bucket. Selection of the reason at the UE is made when the token bucket counter for the specified bucket crosses the designated limit |

From Table 7, the reason may be a traffic event overflow and the preconditions may be a bucket identifier or a token bucket limit.

Other examples of reasons and preconditions may be also provided for traffic events.

In a further embodiment, the selection of the partition may be based on a device group. In particular, in some cases, LTE PRACH configuration options may be augmented with partition information to provide random access opportunities according to a classification of UEs into different groups. The classification may be determined by the eNB or may be pre-configured into the UE. The eNB can configure a number of preambles available in each partition to meet a target collision probability and associated access latency as appropriate for each group of UEs.

In one embodiment, the eNB may decide what constitutes a group based on implementation-specific internal logic and assign a UE to groups according to the logic. For example, the eNB may define groups based on UE characteristics, UE capabilities, UE state, current traffic load on PRACH resources, UE location, a UE's angular direction from an eNB, the time of day, among other factors.

In some embodiments, a UE may determine its group based on a set of classification rules. For example, the rules may be based on UE characteristics, UE capabilities, UE state, UE location, UE velocity, UE direction, estimated path loss, level of interference, battery state, time of the day, among other factors. The rules may either be provided by the eNB or be pre-configured onto the UE. The eNB may also determine the UE group based on implementation dependent classification rules and assign the UEs to a given preamble partition accordingly.

In one alternative, a mapping may be used to correlate a UE group with a preamble partition. When a UE with a group assignment initiates a random access, the UE chooses the random access preamble from the PRACH preamble partition referenced by the map entry corresponding to the assigned group. The mapping may either be provided by the eNB or be pre-configured into the UE.

Thus, for example, a device group reason may use a single value precondition. Reference is now made to Table 8:

TABLE 8

Device Group reasons with single-value precondition

| Information | Definition |
|---|---|
| $r_j$ | (r_deviceGroup, rUID) |
| $c_j$ | device group identifier. The identifiers are either assigned by the eNB, or pre-configured into the UE, or derived by the UE based on pre-configured classification rules. Selection of the reason at the UE is made by simply matching the group identifier with the selection criteria |

From Table 8, the device group identifiers can be assigned by the eNB or configured onto the UE. Matching may be made by simply matching the group identifier with the selection criteria.

In a fourth embodiment, the partitions may be decided based on a device event. Thus, LTE PRACH configuration options may be augmented with partition information to provide random access opportunities in response to different device-related events detected at the UE. The eNB can configure the number of preambles available in each partition to meet a target collision probability, and associated access latency, that is appropriate for each type of event.

In one embodiment, a mapping may be used to correlate a device event with a preamble partition. For example, events may include a change in device status such as locked, unlocked, battery level being below a threshold, a radio interface being on or off, among other factors; a start of a device state transition such as going from idle, idle going to connected; a level of interaction with a user, such as recent key presses, touch-screen gestures, status of screen or screen backlight, the status of other user input devices responding to user input gestures, among other factors; a change in direction; a movement into or out of a predefined area; a health-monitoring sensor alert; or an expiration of a keep-alive timer, among other factors. A device event may also include events related to radio resource management such as radio link failure which is an event triggered in the RRC Connected state when the downlink quality of the serving cell deteriorates beyond a threshold.

When a configured event is detected, the UE may choose a random access preamble partition referenced by a mapping that was either provided by the eNB or preconfigured onto the UE. In some embodiments, device events may be assigned to device event groups for classification.

Thus, a device event reason may use a single value precondition as seen in Table 9 below.

TABLE 9

Device Event reasons with single-value precondition

| Information | Definition |
|---|---|
| $r_j$ | (r_deviceEvent, rUID) |
| $C_j$ | device event identifier. The identifiers are pre-defined and known to both the eNB and the UE; for example, this may include the enumerated set (unlocked, batteryLow, userInteraction, sensor Alert). Selection of the reason at the UE is made by simply matching an event detected by the UE with the selection criteria |

As seen in the above table, the device event identifier may be used for selection where the identifiers may be predefined or known to both the eNB and the UE and may include an enumerated set. The selection at the UE is made by matching the event detected by the UE with the selection criteria.

In a fifth embodiment, the selection may be based on a device state. Thus, LTE PRACH configuration options may be augmented with partition information to provide random access opportunities according to the current state of the UE. The eNB may configure the number of preambles available in each partition to meet a target collision probability and associated access latency that is appropriate to each UE state. Examples of state include Access Stratum (AS) states or configurations or Non Access Stratum (NAS) states or configurations.

In one embodiment, a mapping may be used to correlate a UE state with a preamble partition. For example, the states may include RRC idle, RRC connected, quiescent, responding to a page, in handover or a connected mode with or without uplink synchronisation (TAT expired or not), a long or short discontinuous reception (DRX) state or continuous reception, the availability or configuration of PUCCH resources, Evolved Packet System Connection Management (ECM) in connected or idle states, Evolved Packet System Mobility Management (EMM), registered or deregistered state, mobility state; high or low speed, among other states.

When a UE initiates a random access, the UE may choose the random access preamble from the PRACH preamble partition referenced by the map entry corresponding to the current state. The mapping may either be provided by the eNB or pre-configured onto the UE.

Thus, the device state may use, in one embodiment, a single value precondition as provided in Table 10 below:

TABLE 10

Device State reasons with single-value precondition

| Information | Definition |
|---|---|
| $r_j$ | (r_deviceState, rUID) |
| $C_j$ | device state identifier. The identifiers are pre-defined and known to both the eNB and the UE; for example, this may include the enumerated set (idle, connected, dormant). Selection of the reason at the UE is made by simply matching the current state at the UE with the selection criteria |

From Table 10, the device state identifier may provide an enumerated set of device states that the UE may then simply match with the current state of the UE as the selection criteria, for example.

In a sixth selection criteria, the selection may be based on application characteristics. Thus, the LTE PRACH configuration options may be augmented with partition information to provide random access opportunities for different applications or classes of applications and their uplink traffic. The augmented PRACH configurations allow a UE to select random access preambles from a PRACH preamble partition that meets the latency requirements of an application and its traffic.

In one embodiment, the PRACH preamble partition may be selected based on an activity, type, label, or identifier corresponding to an application that generated the traffic or the event that initiated the random access attempt.

In other embodiments, the PRACH preamble partition may be selected based on an application status or characterization, such as whether or not the application is running in a background mode of communication at the time the traffic or the event that generated the random access attempt. A background mode of communication may comprise a state where the current Quality of Service (QoS) requirements may be relaxed from a normal QoS levels due, for example, to the absence of recent user interaction with the device, or due to a latency tolerance of the application's traffic.

In other embodiments, the preamble partition may be selected based on the activity or profile of the data resulting from one or more applications running, open, or in use on the device. These activities or profiles may include, for example, estimations, predictions or measurements of the data volume or data rates required by the radio connection or by one or more applications; estimations, predictions or measurements of packet arrival or inter-arrival times; the execution status of running applications, including whether or not the applications are open, running in the foreground or background, stored in a suspended or hibernated state in memory, among other factors; or the protocol status of running applications, including whether or not acknowledgements or replies from a peer entity are pending and whether further data exchange is expected for example within period of time.

An application characteristic reason may use a single value precondition, for example. One example is provided below with regard to Table 11.

TABLE 11

Application Characteristic reasons with single-value precondition

| Information | Definition |
|---|---|
| $r_j$ | (r_appCharacteristic, rUID) |
| $C_j$ | application characteristic. The characteristics are pre-defined and known to both the eNB and the UE. Selection of the reason at the UE is made by simply matching the characteristic to the application that generated the traffic or the event that initiated the random access attempt |

As seen above, the precondition includes an application characteristic and the selection at the UE is made by simply matching the characteristic to the application that generated the traffic or the event that initiated the random access attempt.

In a seventh embodiment for the selection of partition, an assignment may simply be made to a UE. In this alternative, the UE does not select a preamble partition and instead the PRACH preamble partition is determined by a node or entity within the network. Such nodes or entities may include the eNB, a Mobility Management Entity (MME), a Serving Gateway (SGW), a Packet Gateway (PGW) or a Policy Charging and Rules Function (PCRF). The UE may then be assigned the preamble partition through dedicated signalling.

Signalling of Preamble Partition Configuration

The signaling of the preamble partitions to the UEs could be done in a variety of ways. In one embodiment, configuration information may be communicated to a plurality of UEs through a downlink broadcast channel. Such information is termed a common configuration in the present disclosure.

In a further embodiment, configuration information may be communicated to a specific UE through downlink dedicated channels. This is referred to herein as a dedicated configuration.

In further alternatives, configuration information may be communicated to one or more UEs through a combination of common and dedicated configurations.

Further, in some embodiments, a UE may be instructed to use a particular PRACH preamble partition through a signaled order.

In other embodiments, where the UE is assigned a preamble partition using dedicated signalling, the PRACH preamble definition may be signaled to the UE, and the PRACH preamble partition usage policies and/or reason selection criteria may be omitted.

The PRACH preamble partition information may be conveyed in a PRACH preamble partition information element. In some embodiments, a radio resource control (RRC) information element may be used to convey the PRACH preamble partition configuration to UEs as either part of the common configuration or a dedicated configuration.

Reference is now made to Appendix A, which shows one example of a PRACH preamble partition information element. As seen in the example of Appendix A, partition identifiers, partition mask indexes, start preambles, number of preambles, among other information such as a window size, content resolution timer, maximum number of preamble retransmissions allowed on the partition and back off intervals are defined in the PRACH preamble partition information element.

In some embodiments, the parameters governing the timing between steps in the random access procedure such as the window size, resolution timer, maximum number of preamble retransmissions allowed on the partition, back off interval, etc., are adapted to match the collision probability expected of a particular PRACH preamble partition. Accordingly, each PRACH preamble partition definition may have an associated set of random access procedural parameters. One PRACH Preamble Partition Information Element may be needed for each available RACH partition in the cell.

Common Configuration

Common configuration information may be transmitted by an eNB to all UEs within a serving area of a cell through a downlink broadcast channel. In a long term evolution (LTE) system, common configuration information elements may be included in a System Information Block (SIB). Common configuration information can be modified by an eNB but updates are may occur infrequently.

The common configuration may be accomplished through common RACH configuration information elements of an existing RRC data structure. One or more of the information elements may be broadcast by an eNB in a system information block.

Reference is now made to Appendix B. As seen in Appendix B, a common PRACH preamble partition configuration may be included as part of the system information block. This is shown with "rach-Partitions Common SEQUENCE OF RACH-PreamblePartitions".

Dedicated Configuration

Dedicated configuration information may be transmitted by an eNB to a specific UE through a downlink dedicated channel. In an LTE system, dedicated configuration information elements may be included in a Radio Resource Configuration (RRC) message. Dedicated configuration information may be provided to a UE during initial attachments to a cell but may also be updated by an eNB at any time as a network and/or UE conditions change.

In some embodiments, a PRACH preamble partition configuration may be added to a dedicated RRC information element of an existing RRC data structure. One or more of the information elements may be signaled by the eNB in an RRC message, as for example shown with regard to Appendix C.

As seen in Appendix C, a dedicated PRACH preamble partition configuration is provided in a RadioResourceConfigDedicated message.

Signalling Using an Order

A signaled order may be transmitted by an eNB to a specific UE through a downlink dedicated channel. This order may override any other PRACH usage policies that a UE may have received and remains in effect until the order is explicitly cancelled or over-ridden by a subsequent order. In an LTE system, the order may be included as an information element in a Radio Resource Configuration (RRC) message or may be included as a MAC control element in any downlink MAC PDU.

In some embodiments, an order includes a complete PRACH preamble definition. In an LTE system, for example, this may be communicated to the UE in an RRC message.

Alternatively, the order may include a device group identifier that is used to reference a previously configured PRACH preamble partition. In an LTE system, for example, this may be communicated to a UE in either an RRC message or in a MAC control element.

In other embodiments, an order includes a partition identifier or index that is used to reference a previously configured PRACH preamble partition. In an LTE system, for example, this may be communicated to the UE in an RRC message or in a MAC control element.

Using MAC control elements, the PRACH preamble partition referenced by an order may have been previously configured in a UE, for example through other dedicated common information elements.

Figure 5:
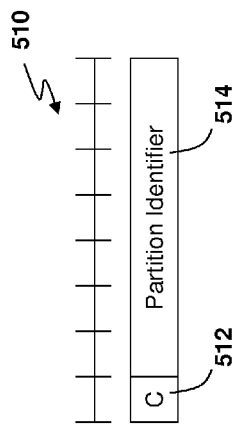
FIG. 5 is a block diagram of a control element for unqualified physical random access channel preamble partition order.

Various alternatives for MAC control elements exist. In one embodiment, an unqualified order may instruct the UE to use a specific PRACH preamble partition for all of its random access attempts. Reference is now made to FIG. 5.

As seen in FIG. 5, a MAC control element 510 consists of a single bit field 512 as well as a partition identifier field 514.

The single bit field 512 may be set to 1, which may indicate that a PRACH preamble partition from the common configuration should be used. When the field 512 is set to 0, this may indicate that the PRACH preamble partition from the dedicated configuration should be used.

Partition identifier field 514 contains the rapp-PartitionID of the RACH-PreamblePartition within the indicated sequence of common or dedicated configurations.

In other embodiments, the MAC control element may be a qualified class order, which instructs the UE to use certain RACH partitions for a given class of reasons. Thus, the qualified class order instructs the UE to use a specific PRACH preamble partition for all of its random access attempts that are related to one or more classes of reasons.

Figure 6:
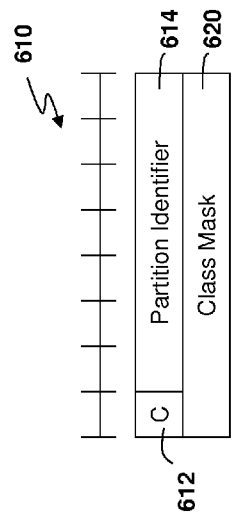
FIG. 6 is a block diagram of a control element for qualified class order.

Reference is now made to FIG. 6, which shows a MAC control element 610 having a single bit identifier 612 as well as a partition identifier 614. The MAC control element of FIG. 6 further includes a class mask 620.

The single bit identifier 612 is used to indicate whether or not the PRACH preamble should use the common or dedicated configuration. For example, when the single bit area 612 is set to 1, this may indicate that a PRACH preamble partition from the common configuration should be used. Conversely, when the single bit field 612 is set to 0, this may indicate that the PRACH preamble partition from a dedicated configuration should be used.

Partition identifier field 614 contains the rapp-PartitionID of the RACH-PreamblePartition within the indicated sequence of common or dedicated configurations.

Class mask field 620 is a mask where, when a bit in the mask is set to "1", the corresponding reason class is affected by the order. Thus, up to eight reason classes may be provided and the mask may indicate which of the reason classes should be used based on the use of a bit set to 1 for the reason class or reason classes to be used.

In a further alternative embodiment, the MAC control element may provide a qualified reason order to instruct the UE to use certain RACH partitions for a given reason. Thus, the qualified reason order instructs the UE to use a specific PRACH preamble partition for all its random access attempts that are related to a specific reason.

Figure 7:
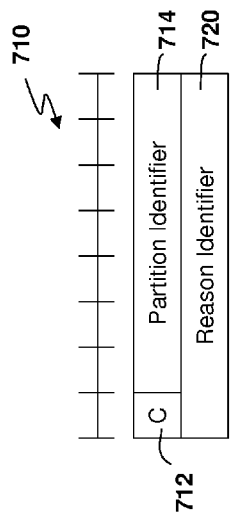
FIG. 7 is a block diagram of a control element for qualified reason order.

Reference is now made to FIG. 7. In FIG. 7, a MAC control element 710 provides a single bit field 712 as well as a partition identifier field 714.

MAC control element 710 further includes a reason identifier field 720.

The single bit field may indicate whether the common or dedicated configuration should be used. For example, if the single bit field is set to 1, this may indicate that the PRACH preamble partition from the common configuration should be used, whereas if the bit field 712 is set to 0 then this indicates that a PRACH preamble partition from the dedicated configuration should be used.

The partition identifier field 714 contains the rapp-PartitionID of the RACH-PreamblePartition within the indicated sequence of common or dedicated configurations.

The reason identifier field 720 identifies the reason affected by the order.

Figure 8:
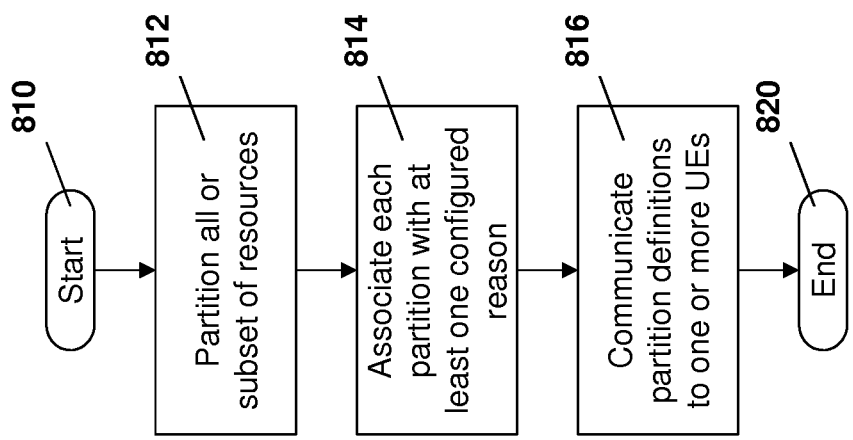
FIG. 8 is a process diagram showing a network node partitioning resources and communicating the partitioned resources.

Based on the above, reference is now made to FIG. 8, which shows a process at a network node such as an eNB, scheduler, among others. The present disclosure is not limited to any particular network node performing the methods described herein.

The process of FIG. 8 starts at block 810 and proceeds to block 812, in which the network node partitions all or a subset of contention based resources. The contention based resources can be LTE PRACH preambles in one embodiment.

The partitioning of block 812 can be based on probability of collisions and latency considerations, and can done based on the embodiment of FIG. 3 and FIG. 4 and the partitioning embodiments described above. In particular, for backward compatibility, the partitioning may use reserved resources in one embodiment. Further, the number of preambles, the location of physical random access channel resources, parameters governing generation of random access preambles, a mask for where the partition may be used, a starting preamble, or a number of preambles allocated to a partition can all be set during the partitioning.

The process next proceeds to block 814, in which each partition may be associated with at least one configured reason for selecting the partition. The configured reasons may be any of those described above, and include reasons associated with a device state, device event, a device group, a traffic event, a traffic class or an application characteristic. A precondition for each reason may be preconfigured on a UE or communicated to the UE by the network node.

The process next proceeds to block 816, in which the partition definitions may be communicated to at least one UE. The communication may be for a common configuration over multicast, and can use a partition preamble information element as part of a system information block, for example. The communication may be unicast over a dedicated connection as part of an RRC message, for example, or may be an order such as those illustrated with reference to FIGS. 5 to 7.

From block 816 the process proceeds to block 820 and ends.

UE Aspects

From a UE perspective, various changes may be made to the embodiment of FIG. 2. In particular, reference is now made to FIG. 9.

Figure 9:
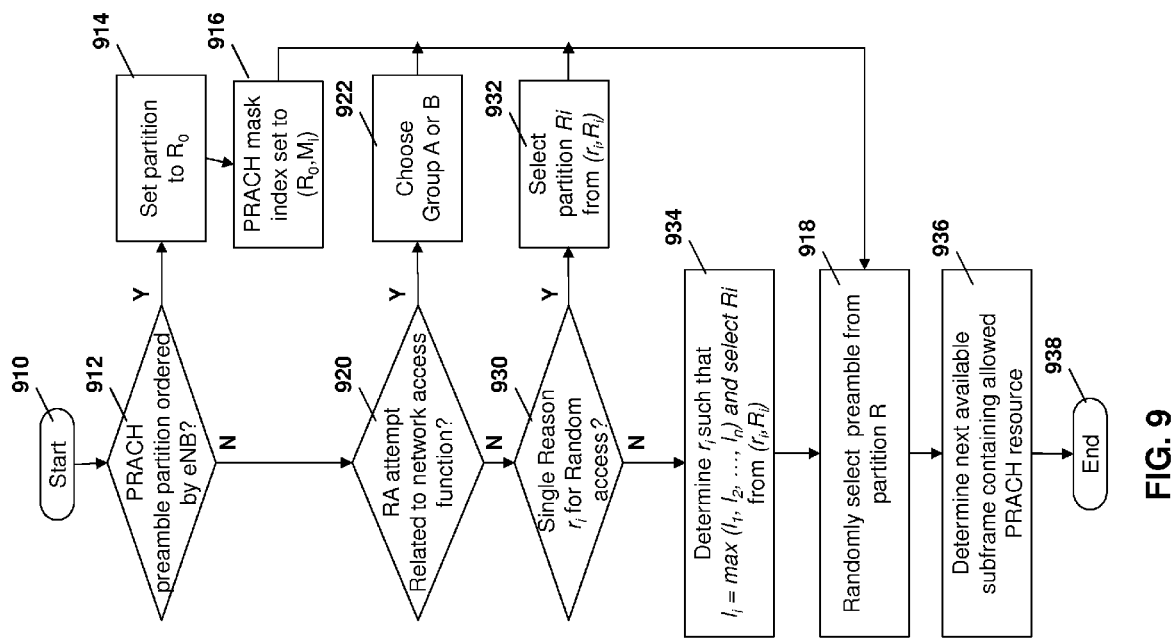
FIG. 9 is a process diagram showing the selection of a preamble at a user equipment.

The process of FIG. 9 starts at block 910 and proceeds to block 912 in which a check may be made to determine whether the PRACH preamble partition to be used by the UE was ordered by the eNB. If yes, the process proceeds to block 914 in which the UE may set the partition to the partition received in the order, $R_o$.

The process then proceeds to block 916 in which the PRACH mask index may be set equal to the PRACH mask associated with the configured tuple $(R_o, M_i)$.

From block 916 the process proceeds to block 918.

From block 912, if the partition was not ordered by the eNB, the process then proceeds to block 920 in which a check is made to determine if the random access attempt is related to a network access function. If yes, then the process proceeds to block 922 in which the UE may determine the appropriate group, either A or B, for the access request. A group A decision will use the partition $R_A$ and a group B decision will use the partition $R_B$. The PRACH mask index is set to 0 (not shown), indicating that all PRACH resources in the frame can be used.

From block 922 the process proceeds to block 918.

From block 920, if the network access functionality is not the reason for the random access attempt, the process proceeds to block 930, where the current conditions in the UE may be related to the preconditions of a configured reason.

At block 930, a check may be made to determine if there is a single reason $r_i$ for selecting a partition. If yes, the process proceeds to block 932 in which the UE selects the partition $R_i$ from the configured tuple $(r_i, R_i)$.

Conversely, if there is not a single reason found at block 930, then there may be multiple reasons and the process proceeds to block 934. At block 934 the UE has determined that there are multiple reasons $\{r_1, r_2, \ldots, r_n\}$ for selecting a partition and the UE then may determine $r_i$ such that $l_i$=max $(l_1, l_2, \ldots, l_n)$ and then may select the partition $R_i$ from the configured tuple $(r_i, R_i)$.

The PRACH mask index may be set equal to the PRACH mask associated with the configured tuple $(R_i, M_i)$ (not shown).

From block 932 or block 934, the proceeds to block 918.

At block 918, once the UE has determined the appropriate PRACH preamble partition R, the UE randomly may select a preamble $z_r$ from within R and proceeds to block 936.

At block 936 the UE then may determine the next available subframe containing an allowed PRACH resource, as defined by the prach-ConfigIndex and the PRACH mask index. The UE then may transmit the selected preamble $z_r$ in the selected PRACH resource of the allowed subframe $sf_0$, proceeds to block 938 and ends.

Referring to FIG. 2, the remainder of the random access procedure may also be modified. In one embodiment, the UE may have been configured with a rapp-SupervisionInfo parameter that may modify the timing of the random access response and msg3 and contention resolution steps of FIG. 2. For instance, a partition used for a higher priority reason may be configured with various timers such that the timing between various steps of the RACH process is shorter than that of a lower priority reason. The parameters to be used by the UE may be those that either were ordered by the eNB or were configured for the PRACH preamble partition selected by the UE as provided in FIG. 9 above.

In one embodiment, the UE may monitor the PDCCH for a random access response from the eNB in a response window that begins at subframe $(sf_0+3)$ and continues through subframe $(sf_0+3+rapp\_ResponseWindowSize)$. If the random access response referencing the preamble $z_r$ is detected by the UE, the UE may then transmit the msg3 queued in the uplink buffer.

In one embodiment, the eNB may override one or more of the rapp-SupervisionInfo parameters with an order included in the random access response. If an order is received in the random access response referencing the preamble $z_r$, the UE may use the ordered parameters in subsequent steps of the random access procedure related to the transmission of the preamble $z_r$.

In some embodiments, once the UE has transmitted the msg3, the UE may initialize its contention resolution timer to the rapp-ContentionResolutionTimer and may begin to monitor the PDCCH for a for a downlink transmission addressed to the C-RNTI of the UE. If a downlink transmission addressed to its C-RNTI is detected, the UE may stop the contention resolution timer. The UE may use the value of the rapp-ContentionResolutionTimer included in the random access response order or configured for the selected partition.

In one embodiment, if the UE does not detect a random access response referencing its preamble $z_r$ or if the contention resolution timer expires, the UE may increment the number of preamble transmissions made by the UE in the current random access attempt. If the number exceeds a value of the rapp-PreambleTransMax, the UE may abandon the random access attempt and report a failure to its upper layers. The UE may use the value of the rapp-PreambleTransMax included in the RAR order or configured for the selected partition.

Otherwise, the UE may initialise its back off timer to a value chosen randomly from the interval [0 . . . rapp_BackoffInterval]. When the back off timer expires, the UE initiates another preamble transmission starting at block 918 of FIG. 9. The UE may use the value of the rapp-BackoffInterval included in the RAR order or configured for the selected partition.

Network Aspects

In some embodiments, an eNB may process a received random access preamble according to a priority associated with the PRACH preamble partition where the preamble was detected. For instance the eNB may process and respond to preambles received on a partition used for higher priority reasons quicker than those received on a partition used for lower priority reasons. In one embodiments, the priority is a pre-configured value. In other embodiments, the priority may be based on the number of preambles received by the eNB.

In further alternative embodiments, the priority may be based on the relative values of the random access procedural parameters associated with each of the partitions in which at least one preamble was received.

In one embodiment, the time between the reception of a preamble at the eNB and the transmission of the random access response by the eNB may be shorter for a preamble received in a partition intended to serve higher priority events or traffic than for a preamble received in a partition associated with lower priority events or traffic.

In some embodiments, the time between the reception of an msg3 at the eNB and the transmission of a contention resolution control element by the eNB may be shorter for a preamble received in a partition intended to serve higher priority events or traffic than for a preamble received in a partition associated with lower priority events or traffic.

If the priority is based on the relative values of the random access procedural parameters associated with each of the partitions in which at least one preamble is received, preamble partitions with a smaller value of rapp-ResponseWindowSize may be processed at a higher priority than those with a larger value.

In some embodiments, the eNB may include an order in the random access response to over-ride defaults or configured rapp-SupervisionInfo parameters associated with a preamble partition. The values included in the RAR order may be based, for example, on the relative priority of the preamble partition or on the number of preambles received by the eNB or on the current processing load within the eNB.

In some embodiments, the size of the uplink grant in the RAR may also be dependent on the PRACH preamble partition where the preamble was detected. The size may be based, for example, on the type of traffic or event configured to use that partition, or on the group of UEs assigned to use that partition, or on the type of application allowed to use that partition. For instance, the eNB may grant a larger resource in the uplink in response to a PRACH preamble received on a partition used for one reason when compared to that received on a partition used for a different reason.

Figure 10:
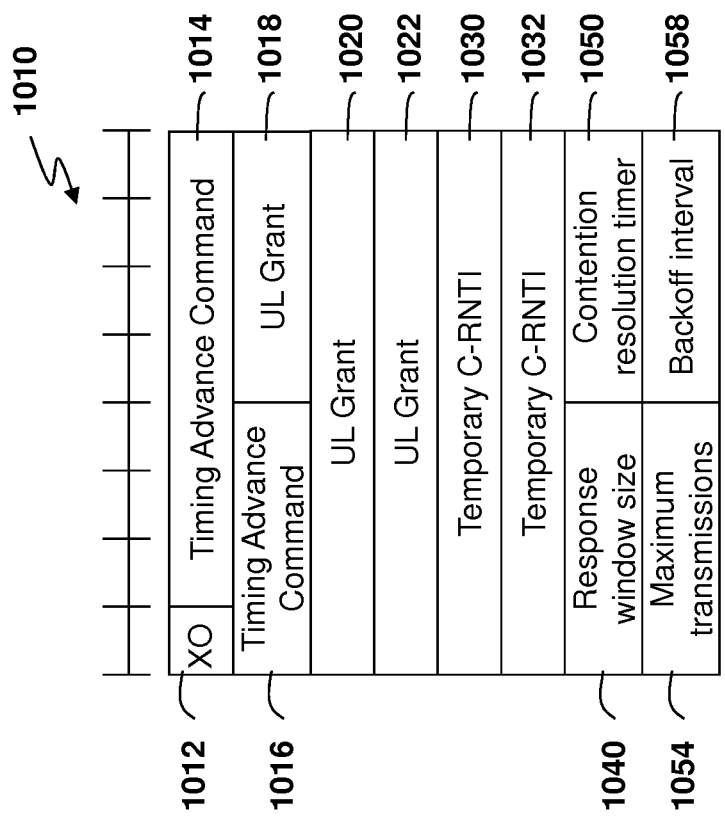
FIG. 10 is a block diagram showing a random access response with an order.

Reference is now made to the Random Access Response in FIG. 10. As seen in FIG. 10, a first bit field 1012 is used to indicate that an RAR has been extended within a random access parameter order. Currently in LTE Release 10 this field may be reserved and must be set to '0', thus the use of this field provides backward compatibility with legacy UEs.

A timing advance command field 1014 remains unchanged from current specifications. Similarly, a timing advanced field 1016 and uplink grant fields 1018, 1020 and 1022 remain unchanged.

Similarly, temporary C-RNTI fields 1030 and 1032 remain unchanged.

A response window size field 1040 defines the maximum duration of the RAR window following the preamble transmission and corresponds to the rapp-ResponseWindowSize as described above.

A contention resolution timer field 1050 defines the maximum duration of the contention resolution window following the transmission of an msg3. This corresponds to the rapp-ContentionResolutionTimer as described above.

A maximum transmissions field 1054 defines the maximum number of preamble selections and transmissions allowed in a single random access attempt. The field corresponds to the rapp-PreambleTransMax described above.

A backoff interval field 1058 defines the backoff interval to be used following a failure to receive positive confirmation that a preamble transmission was received. This corresponds to the rapp-BackoffInterval as described above.

Figure 11:
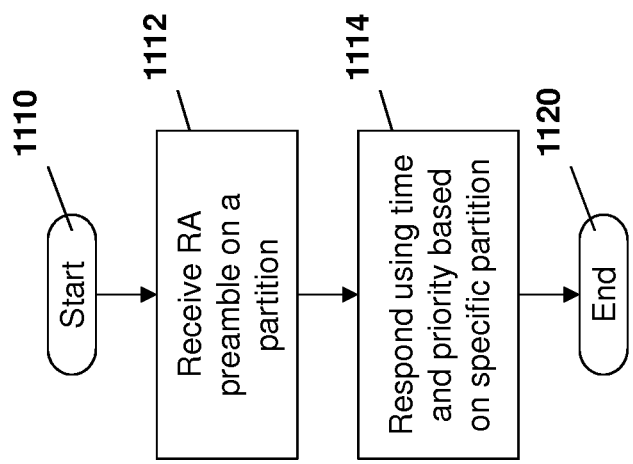
FIG. 11 is a process diagram showing a network node responding to receipt of a random access preamble.

Based on the above, reference is made to FIG. 11, which shows a process at a network node receiving a preamble on a partition.

The process of FIG. 11 start at block 1110 and proceeds to block 1112 in which the random access preamble is received at the network element on a particular partition. The network node makes note of the partition, and at block 1114 responds to the preamble receipt using a time and priority associated with the partition the preamble was received on.

The process then proceeds to block 1120 and ends.

The above may be implemented by any network node. A simplified network node is shown with regard to FIG. 12. The network node of FIG. 12 may be eNB 212, among others.

Figure 12:
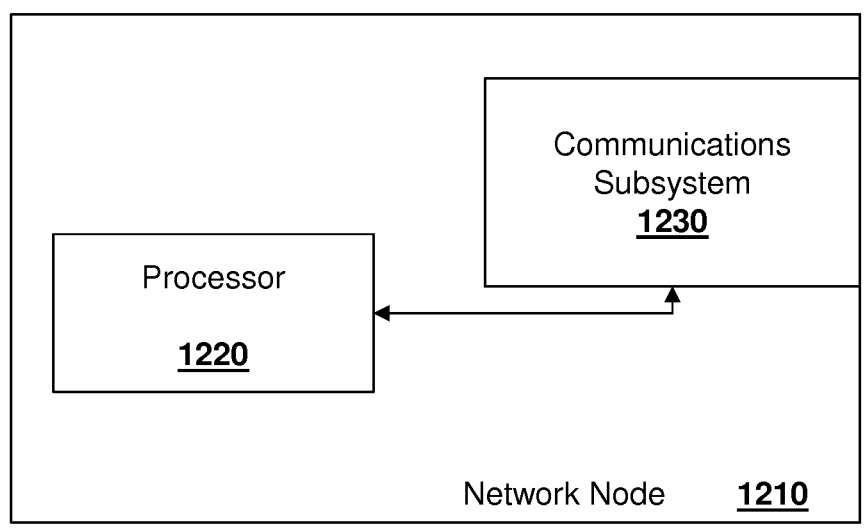
FIG. 12 is a simplified block diagram of a network element capable of being used with the embodiments of the present disclosure.

In FIG. 12, network node 1210 includes a processor 1220 and a communications subsystem 1230, where the processor 1220 and communications subsystem 1230 cooperate to perform the methods described above.

Figure 13:
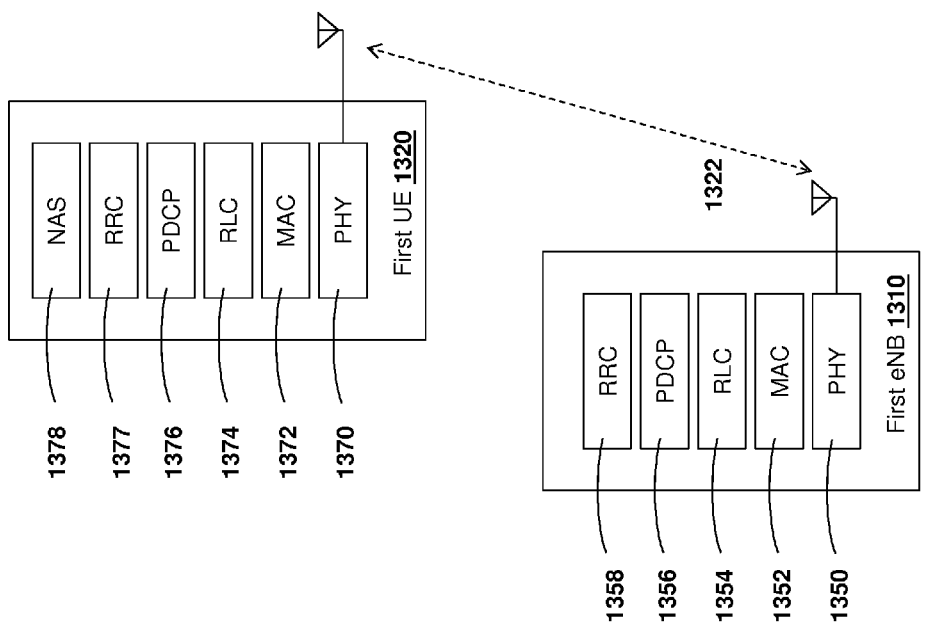
FIG. 13 is a block diagram illustrating communications between the eNB and UE.

Reference is now made to FIG. 13, which shows a simplified architecture for communication between various elements in a system. In particular, an eNB 1310 provides cell coverage to a first area and may serve a UE 1320, which communicates with the eNB 1310 through communication link 1322.

As shown in the example of FIG. 13, each element includes a protocol stack for the communications with other elements. In the case of eNB 1310 the eNB includes a physical layer 1350, a medium access control (MAC) layer 1352, a radio link control (RLC) layer 1354, a packet data convergence protocol (PDCP) layer 1356 and a radio resource control (RRC) layer 1358.

In the case of UE 1320, the UE includes a physical layer 1370, a MAC layer 1372, an RLC layer 1374, a PDCP layer 1376, an RRC layer 1377 and a non-access stratum (NAS) layer 1378.

Communications between the entities, such as between eNB 1310 and UE 1320, generally occur within the same protocol layer between the two entities. Thus, for example, communications from the RRC layer at eNB 1310 travels through the PDCP layer, RLC layer, MAC layer and physical layer and gets sent over the physical layer to UE 1320. When received at UE 1320, the communications travel through the physical layer, MAC layer, RLC layer, PDCP layer to the RRC level of UE 1320. Such communications are generally done utilizing a communications sub-system and a processor.

Further, the above may be implemented by any UE. One exemplary device is described below with regard to FIG. 14.

UE 1400 is typically a two-way wireless communication device having voice and data communication capabilities. UE 1400 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1400 is enabled for two-way communication, it may incorporate a communication subsystem 1411, including both a receiver 1412 and a transmitter 1414, as well as associated components such as one or more antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the device is intended to operate. The radio frequency front end of communication subsystem 1411 can be any of the embodiments described above.

Figure 14:
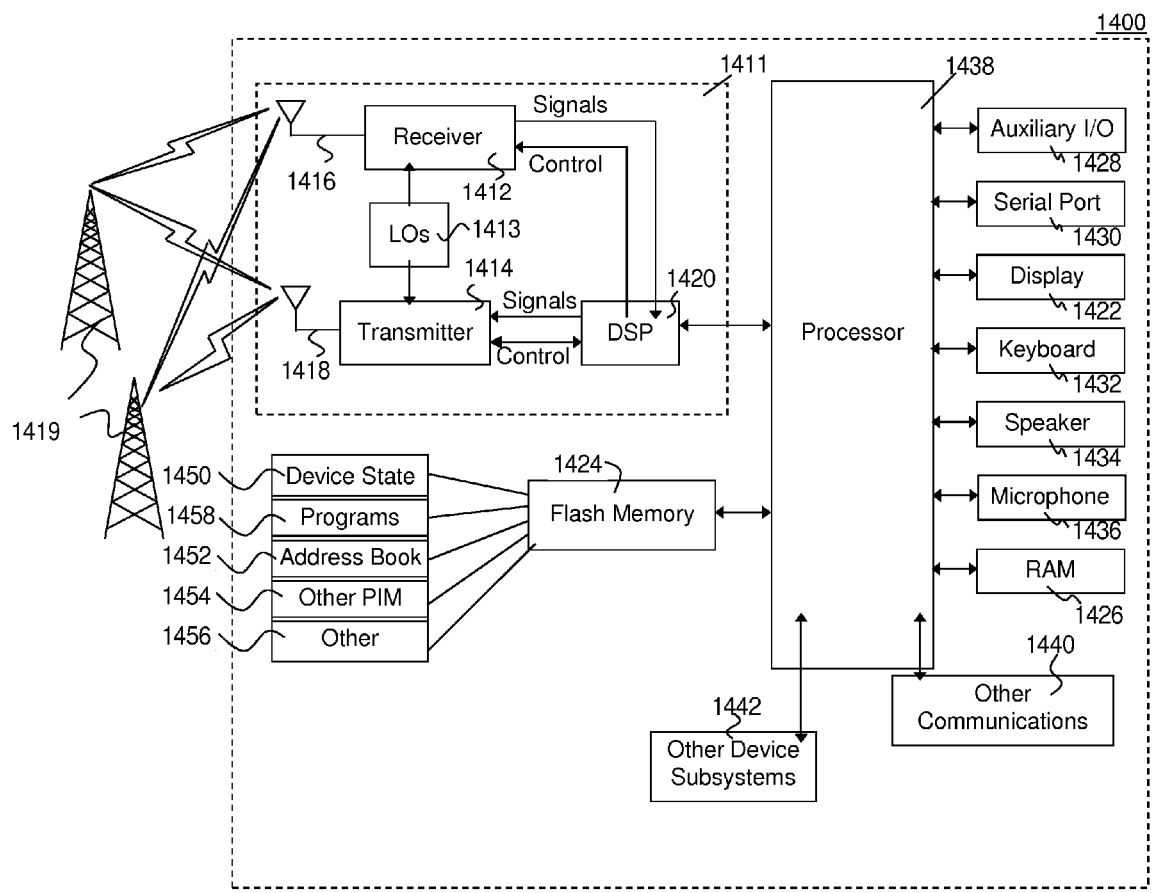
FIG. 14 is a block diagram of an example mobile device.

When required network registration or activation procedures have been completed, UE 1400 may send and receive communication signals over the network 1419. As illustrated in FIG. 14, network 1419 can consist of multiple base stations communicating with the UE.

Signals received by antenna 1416 through communication network 1419 are input to receiver 1412, which may perform such common receiver functions as signal amplification, frequency down conversion, filtering, channel selection and the like.

UE 1400 generally includes a processor 1438 which controls the overall operation of the device. Communication functions, including data and voice communications, are performed through communication subsystem 1411. Processor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystem 1440 such as a short-range communications subsystem and any other device subsystems generally designated as 1442. Serial port 1430 could include a USB port or other port known to those in the art.

As shown, flash memory 1424 can be segregated into different areas for both computer programs 1458 and program data storage 1450, 1452, 1454 and 1456. These different storage types indicate that each program can allocate a portion of flash memory 1824 for their own data storage requirements. Processor 1438, in addition to its operating system functions, may enable execution of software applications on the UE. A predetermined set of applications that control basic operations, including at least data and voice communication applications for example, will normally be installed on UE 1800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

PRACH Preamble Partition Information Element

```
-- ASN1START
RACH-PreamblePartition ::= SEQUENCE {
    rapp-PartitionID            INTEGER (0..15),
    rapp-PRACH-MaskIndex        INTEGER (0..15),
    rapp-StartPreamble          INTEGER (0..63),
    rapp-NumberOfPreambles      ENUMERATED   {
                                n1, n2, n3, n4, n5, n6, n8, n10,
                                n12, n14, n16, n18, n20, n25,
                                n30, n35},
    rapp-SupervisionInfo SEQUENCE {
        rapp-PreambleTransMax   ENUMERATED {
                                n3, n4, n5, n6, n7, n8, n10, n20,
```

APPENDIX A-continued

PRACH Preamble Partition Information Element

```
                               n50, n100, n200},
        rapp-ResponseWindowSize    ENUMERATED {
                               sf2, sf3, sf4, sf5, sf6, sf7,
                               sf8, sf10},
        rapp-ContentionResolutionTimer ENUMERATED {
                               sf8, sf16, sf24, sf32,
                               sf40, sf48, sf56, sf64},
        rapp-BackoffInterval       INTEGER (0..15)
    }                                               OPTIONAL
}
-- ASN1STOP
```

APPENDIX B

Common PRACH Preamble Partition Configuration

```
-- ASN1START
RACH-ConfigCommon ::= SEQUENCE {
    preambleInfo SEQUENCE {
        numberOfRA-Preambles       ENUMERATED {
                               n4, n8, n12, n16 ,n20, n24, n28,
                               n32, n36, n40, n44, n48, n52,
                               n56, n60, n64
    },
    preamblesGroupAConfig       SEQUENCE {
        sizeOfRA-PreamblesGroupA ENUMERATED {
                               n4, n8, n12, n16, n20, n24, n28,
                               n32, n36, n40, n44, n48, n52,
                               n56, n60},
        messageSizeGroupA          ENUMERATED {b56, b144,
                               b208, b256},
        messagePowerOffsetGroupB ENUMERATED {
                               minusinfinity, dB0, dB5, dB8,
                               dB10, dB12, dB15, dB18},
    }                                   OPTIONAL  -- Need OP
    },
    rach-PartitionsCommon      SEQUENCE OF
                               RACH-PreamblePartition
                                        OPTIONAL  -- Need OP
    ...
}
-- ASN1STOP
```

APPENDIX C

Dedicated PRACH Preamble Partition Configuration

```
-- ASN1START
RadioResourceConfigDedicated ::= SEQUENCE {
    srb-ToAddModList       SRB-ToAddModList           OPTIONAL,
                                                      --
Cond HO-Conn
    drb-ToAddModList       DRB-ToAddModList           OPTIONAL,
                                                      --
Cond HO-toEUTRA
    drb-ToReleaseList      DRB-ToReleaseList          OPTIONAL,
                                                      --
Need ON
    mac-MainConfig         CHOICE {
        explicitValue              MAC-MainConfig,
        defaultValue               NULL
    }                                                 OPTIONAL,
                                                      --
Cond HO-toEUTRA2
    sps-Config             SPS-Config                 OPTIONAL,
                                                      --
Need ON
    physicalConfigDedicated  PhysicalConfigDedicated  OPTIONAL,
                                                      --
Need ON
    rach-PartitionsDedicated SEQUENCE OF RACH-PreamblePartition
                                                      OPTIONAL --
Need OP
    ...
```

APPENDIX C-continued

Dedicated PRACH Preamble Partition Configuration

```
}
...
-- ASN1STOP
```

The invention claimed is:

1. A method at a network node in a wireless communications network, the method comprising:
    partitioning at least a subset of contention based resources for random access attempts into a plurality of partitions, wherein each of said plurality of partitions is associated with at least one precondition governing selection of the partition, the precondition being derived from at least one of: source of causation for the random access attempt, a device state, a device event, a device group, a traffic event, a traffic class, or an application characteristic, and wherein each of said plurality of partitions is further associated with at least one configuration parameter; and
    communicating configuration parameters for the plurality of partitions and preconditions governing partition usage to at least one of a plurality of user equipments;
    wherein the partitioning dimensions partitions based on a target probability of collision and access latency.

2. The method of claim 1, wherein the contention based resources are random access preambles in a Long Term Evolution Physical Random Access Channel (PRACH).

3. The method of claim 1, wherein the configuration parameters for at least one of the plurality of partitions comprises at least one of: a response window size, contention resolution timer values, maximum random access re-transmissions allowed value, or back off interval.

4. The method of claim 1, wherein the device state comprises: a Radio Resource Control (RRC) state, responding to page, in handover, in connected mode with or without uplink synchronization, a long or short discontinuous reception (DRX) state, a continuous reception state, an Evolved Packet System Connection Management (ECM) state, an Evolved Packet System Mobility Management (EMM) state, or a mobility state.

5. The method of claim 1, wherein the traffic class is associated with a quality of service class identifier corresponding to the traffic in the uplink buffer.

6. The method of claim 1, wherein the device event is associated with radio link failure.

7. A network node in a wireless communications network, comprising:
    a processor; and
    a communications subsystem;
    wherein the processor and the communications subsystem cooperate to:
    partition at least a subset of contention based resources for random access attempts into a plurality of partitions, wherein each of said plurality of partitions is associated with at least one precondition governing selection of the partition, the precondition being derived from at least one of: source of causation for the random access attempt, a device state, a device event, a device group, a traffic event, a traffic class, or an application characteristic, and wherein each of said plurality of partitions is further associated with at least one configuration parameter; and communicate configuration parameters for the plurality of partitions and preconditions governing partition usage to at least one of a plurality of user equipments;

wherein the partitioning dimensions partitions based on a target probability of collision and access latency.

8. The network node of claim 7, wherein the contention based resources are random access preambles in a Long Term Evolution Physical Random Access Channel (PRACH).

9. The network node of claim 7, wherein the configuration parameters for at least one of the plurality of partitions comprises at least one of: a response window size, contention resolution tinier values, maximum random access re-transmissions allowed value, or back off interval.

10. The network node of claim 7, wherein the device state comprises: a Radio Resource Control (RRC) state, responding to page, in handover, in connected mode with or without uplink synchronization, a long or short discontinuous reception (DRX) state, a continuous reception state, an Evolved Packet System Connection Management (ECM) state, an Evolved Packet System Mobility Management (EMM) state, or a mobility state.

11. The network node of claim 7, wherein the traffic class is associated with a quality of service class identifier corresponding to the traffic in the uplink buffer.

12. The network node of claim 7, wherein the device event is associated with radio link failure.

* * * * *